(12) United States Patent
Hsu

(10) Patent No.: US 8,824,840 B2
(45) Date of Patent: Sep. 2, 2014

(54) OPTICAL CONNECTOR HAVING LOW INSERTION LOSS AND OPTICAL CONNECTOR ASSEMBLY

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 103 days.

(21) Appl. No.: 13/534,271

(22) Filed: Jun. 27, 2012

(65) Prior Publication Data
US 2013/0251308 A1 Sep. 26, 2013

(30) Foreign Application Priority Data
Mar. 20, 2012 (TW) .................................. 101109419

(51) Int. Cl.
*G02B 6/36* (2006.01)
(52) U.S. Cl.
USPC .................. 385/33; 385/61; 385/74; 385/79
(58) Field of Classification Search
None
See application file for complete search history.

(56) References Cited

U.S. PATENT DOCUMENTS

| 4,265,511 | A * | 5/1981 | Nicia et al. .................. 385/74 |
| 4,718,744 | A * | 1/1988 | Manning ....................... 385/79 |
| 4,812,002 | A * | 3/1989 | Kato et al. .................... 385/33 |
| 5,163,107 | A * | 11/1992 | Garriss ........................ 385/74 |
| 6,766,076 | B2 * | 7/2004 | Nakama et al. ............... 385/33 |
| 2003/0012513 | A1 * | 1/2003 | Ukrainczyk .................. 385/61 |
| 2005/0013542 | A1 * | 1/2005 | Blasingame et al. ......... 385/38 |
| 2012/0033920 | A1 * | 2/2012 | Haley et al. .................. 385/78 |
| 2012/0045176 | A1 * | 2/2012 | Hsu .............................. 385/74 |
| 2012/0170894 | A1 * | 7/2012 | Hsu .............................. 385/74 |

FOREIGN PATENT DOCUMENTS

JP   61-219012 A   *   9/1986

* cited by examiner

*Primary Examiner* — Mike Stahl
(74) *Attorney, Agent, or Firm* — Novak Druce Connolly Bove + Quigg LLP

(57) ABSTRACT

An optical connector assembly includes two optical connectors, each of which includes a transparent shell forming a blind hole and a lensed fiber integrally forming a lens at a front end thereof. The lensed fibers are inserted into the respective blind holes using the front ends and held in the respective blind holes. A distance between the lensed fibers is two times of a working distance of the lensed fibers.

11 Claims, 5 Drawing Sheets

OPTICAL CONNECTOR HAVING LOW INSERTION LOSS AND OPTICAL CONNECTOR ASSEMBLY

BACKGROUND

1. Technical Field

The present disclosure relates to optical connectors and, particularly, to an optical connector and an optical connector assembly for reducing insertion loss of light transmission.

2. Description of Related Art

An optical connector includes a shell and an optical fiber. The shell forms a lens and a holding hole. The optical fiber is held in the holding hole and is required to align with the lens such that the optical fiber can efficiently emit and receive light via the lens to reduce insertion loss of light transmission by the optical connector. However, being limited by manufacturing precision, the optical fiber often misaligns the lens, which increases the insertion loss. In addition, the lens is typically uncovered when the optical connector is not used, thus is exposed to various contaminants and easily scratched, which may also increase the insertion loss.

Therefore, it is desirable to provide an optical connector and an optical connector assembly, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
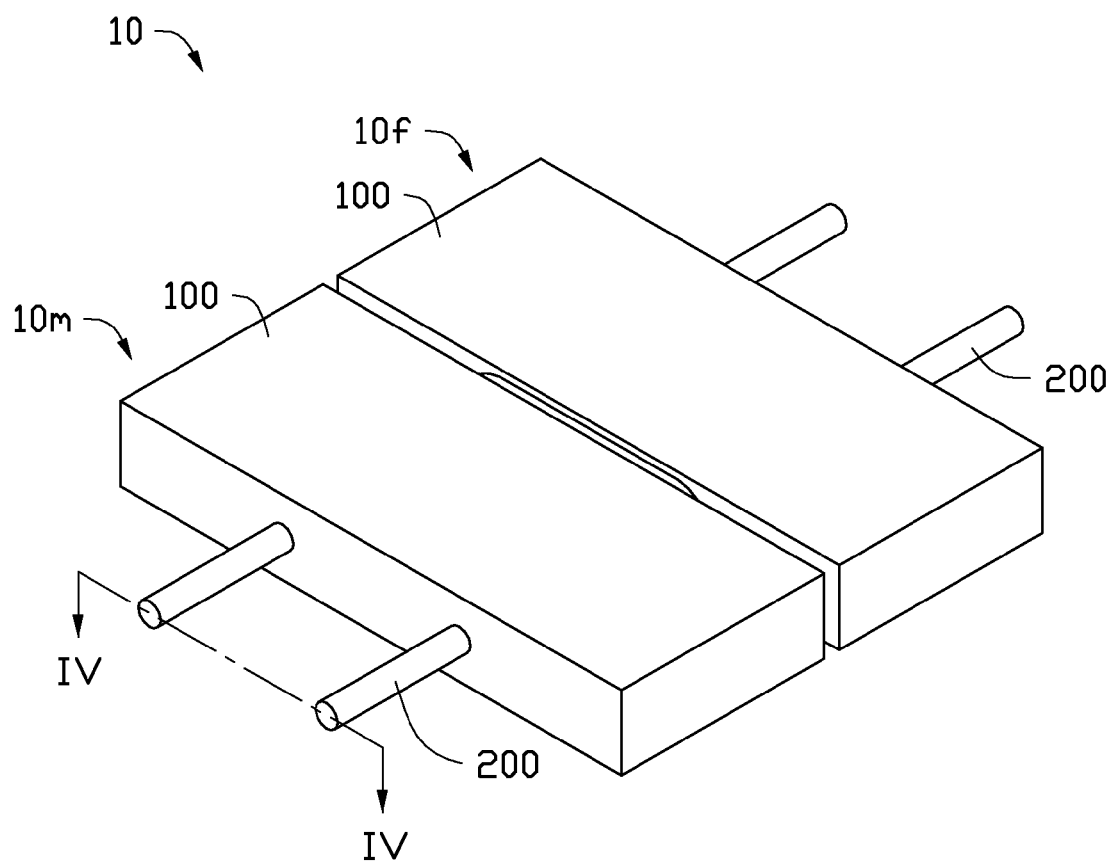
FIG. 1 is an isometric schematic view of an optical connector assembly according to an embodiment.

Embodiments of the present disclosure will now be described in detail with reference to the drawing.

FIG. 1 illustrates an optical connector assembly 10 according to an embodiment. The optical assembly 10 includes two optical connectors, e.g., a male optical connector 10m and a female optical connector 10f. The two optical connectors 10m and 10f are substantially similar to each other, except that the female optical connector 10f includes a connecting sleeve 160 while the male optical connector 10m includes a mating connecting sleeve 160m sleeved by the connecting sleeve 160, thus mechanically connects the two optical connectors.

Figure 2:
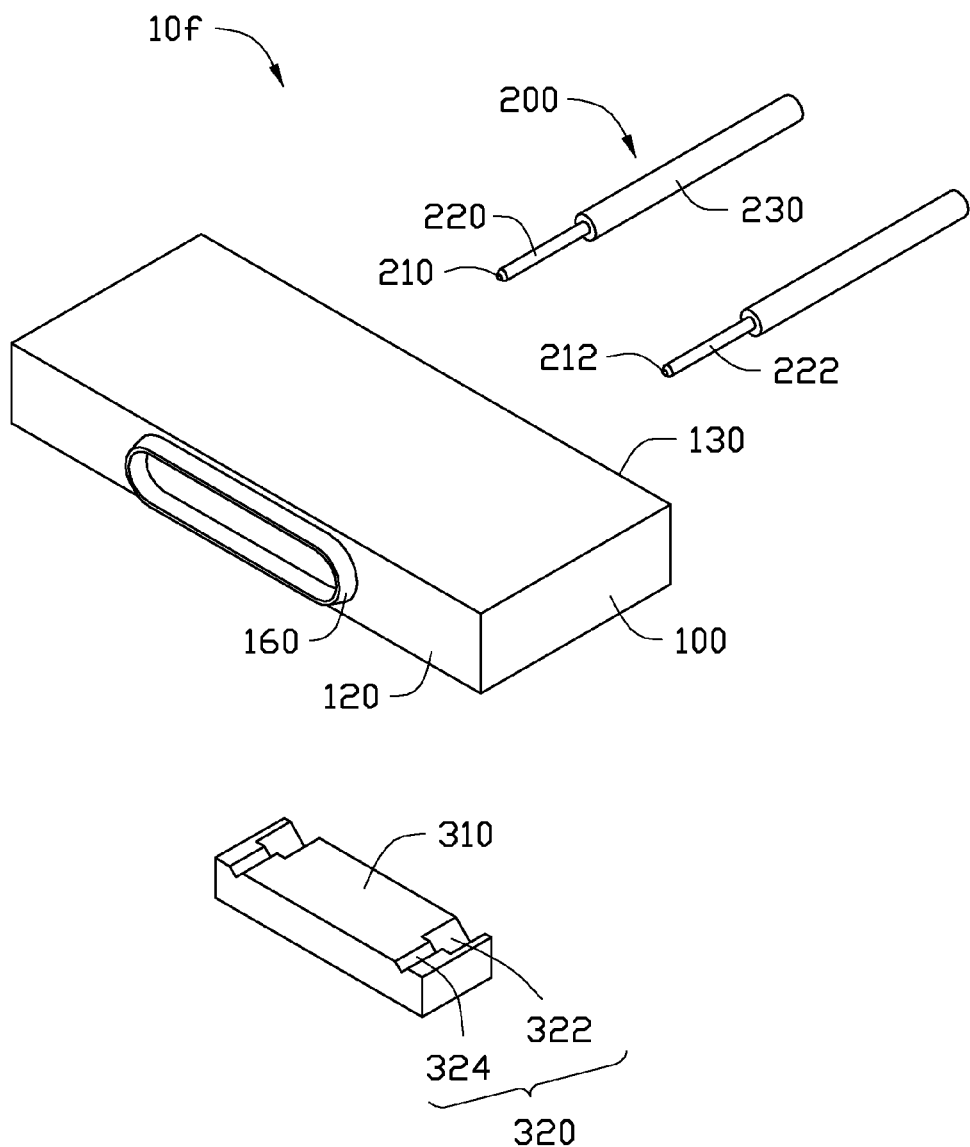
FIG. 2 is an isometric, exploded, schematic view of a female optical connector of the optical assembly of FIG. 1.
Figure 3:
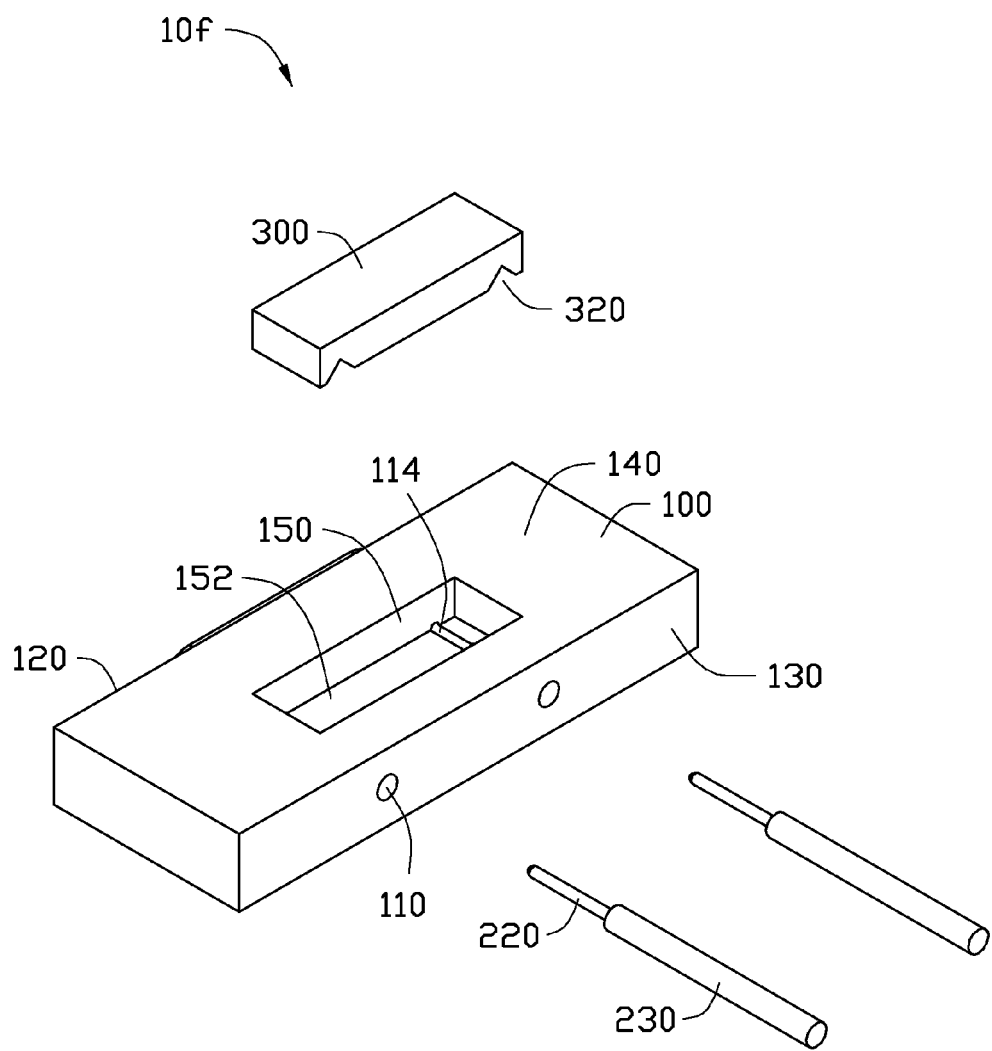
FIG. 3 is similar to FIG. 3, but viewed at another angle.

FIGS. 2-3 illustrate one of the optical connectors, e.g., the female optical connector 10f. The female optical connector 10f includes a transparent shell 100 and two lensed fibers 200. The shell 100 defines two blind holes 110. Each of the lensed fibers 200 integrally forms a lens 210 at a front end 212 thereof. The lensed fibers 200 are inserted into and thereby held in the respective blind holes 100 via the front ends 212 such that the lenses 210 are optically coupled with the respective lenses 210 of the male optical connector 10m (see FIGS. 4-5). That is, the distance between the lensed fibers 200 of the female optical connector 10f and the male optical connector 10m is two times of a working distance of the lensed fibers 200. Each of the lenses 210 can converge collimated light transmitting through the shell 100 into the lensed fiber 200 or collimate light emitted from the lensed fiber 200.

As such, misalignment between a lens and an optical fiber can be avoided. In addition, the lenses 210 are protected in the respective blind holes 110 from being contaminated and scratched, even when the two optical connectors are not used. In all, insertion loss of light transmission between the two optical connectors can be greatly reduced.

The shell 100 is substantially cuboid and includes a front surface 120 and a back surface 130. The two blind holes 110 are defined in the back surface 130.

Each of the lensed fiber 200 includes an optical fiber 220 (including a core and a cladding) and a coating 230 surrounding the optical fiber 220. However, a front section 222 of the optical fiber adjacent to the front end 212 is stripped (i.e., uncovered by the coating 230). The lenses 210 are formed on the respective optical fibers 220 (the front end 212 tapers off to form the lens 210).

Figure 4:
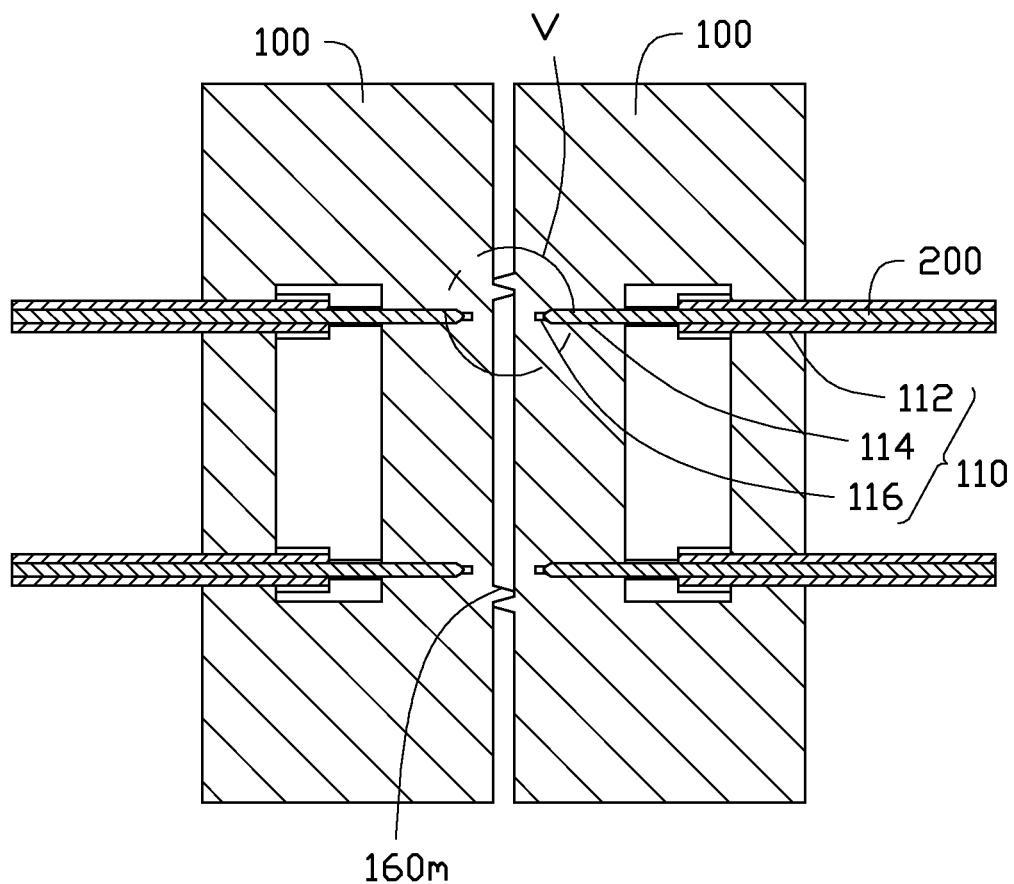
FIG. 4 is a cross-sectional schematic view taken alone a line IV-IV of FIG. 1.
Figure 5:
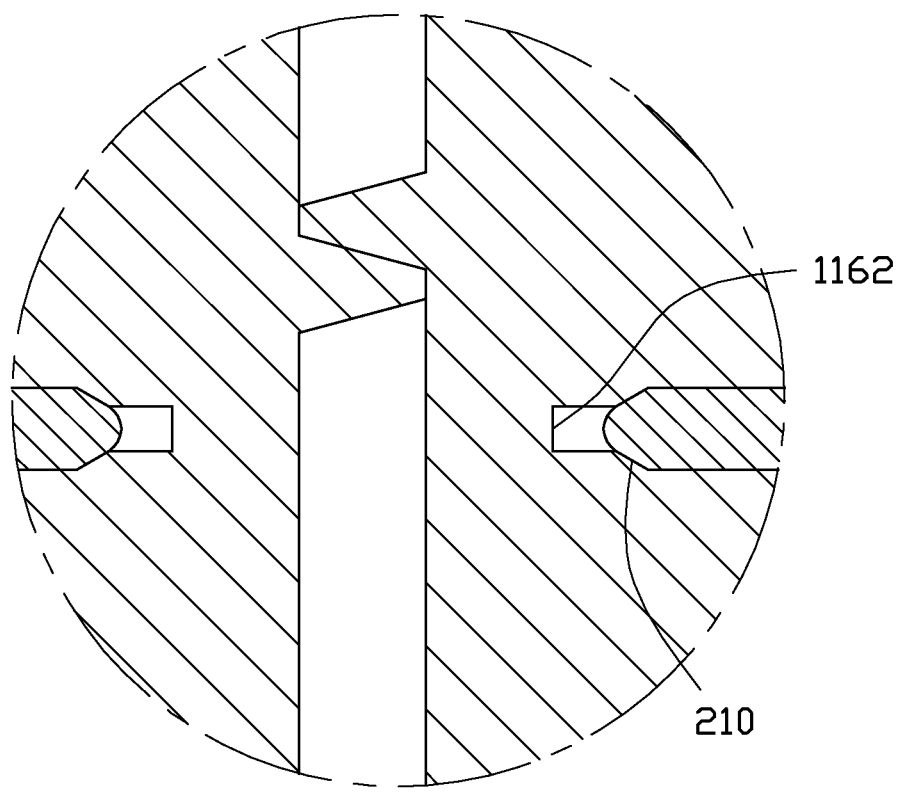
FIG. 5 is a partially enlarged view of a portion V of FIG. 4.

Also referring to FIGS. 4-5, each of the blind holes 210 is divided into a first holed section 112 adjacent to the back surface 130, a second holed section 114 connecting the first holed section 112, and a third holed section 116 connecting the second holed section 114. The first holed section 112 and the second holed section 114 are sized so as to fittingly hold the coating 230 and the front section 222, respectively. A cross-sectional size of the third holed section 116 is smaller than that of the second holed section 114. The second holed section 114 is slightly shorter than the front section 222. As such, the lenses 210 are partially held in the respective third holed sections 116.

To reduce the insertion loss, the front surface 120 and a bottom surface 1162 of the blind holes 110 can employ a mirror surface to efficiently transmit light.

The shell 100 further includes a side surface 140. The shell 100 defines a groove 150 in the side surface 140, communicating with the first holed sections 112 and the second holed section 114. The female optical connector 10f also includes a positioning block 300 fittingly received in the groove 150. The positioning block 300 includes an upper surface 310 facing a bottom surface 152 of the groove 150. The positioning block 300 defines two locating slots 320 in the upper surface 310. The locating slots 320 are for locating the respective lensed fibers 200. Each of the positioning slots 320 includes a first slotted section 322 and a second slotted section 324. The first slotted section 322 is inversed V-shaped and sized to fittingly hold and thus locate the coating 230. The second slotted section 324 is also inversed V-shaped and size to fittingly hold and thus locate the front section 222.

The connecting sleeves 160, 160m extends upward from the front surfaces 120 of the female optical connector 10f and the male optical connector 10m, respectively. Each of the connecting sleeves 160, 160m sleeves a portion of the front surface 120 corresponding to the blind holes 110 to protect light paths between the two optical connectors. In addition, the connecting sleeves 160, 160m can also protect the portions of the front surfaces 120 corresponding to the blind holes 110 from being scratched.

The number of the lensed fibers 200, the blind holes 110, and the locating slots 320 are not limited in this embodiment but can be set depending on requirements. For example, in other embodiments, only one lensed fiber, blind hole, and locating slots 320 are employed.

It will be understood that the above particular embodiments are shown and described by way of illustration only.

The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
   a transparent shell defining a blind hole; and
   a lensed fiber integrally forming a lens at a front end thereof, the lensed fiber being inserted into the blind hole using the front end and held in the blind hole, the lens converging collimated light transmitting through the shell into the lensed fiber or collimating light emitted from the lensed fiber;
   wherein the shell is cuboid and comprises a front surface and a back surface opposite to the front surface, and the blind hole is formed in the back surface.

2. The optical connector of claim 1, wherein the shell comprises a connecting sleeve extending outwards from the front surface, and the connecting sleeve surrounds a portion of the front surface spatially corresponding to the blind hole.

3. The optical connector of claim 1, wherein the lensed fiber comprises an optical fiber and a coating surrounding the optical fiber, a front section of the optical fiber adjacent to the front end is uncovered by the coating, the lens is formed on the optical fiber, the blind hole is divided into a first holed section adjacent to the back surface, a second holed section connected to the first holed section, and a third holed section connected to the second holed section, the first holed section and the second holed section are sized to fittingly hold the coating and the front section, respectively, and a cross-sectional size of the third holed section is smaller than that of the second holed section and the second holed section is slightly shorter than the front section such that the lens is partially held in the third holed section.

4. The optical connector of claim 3, wherein the shell comprises a side surface connecting the front surface and the back surface, the shell defines a groove in the side surface, the groove communicates with the first holed section and the second holed section, the optical connector comprises a locating block, the locating block is fittingly received in the groove and comprises an upper surface facing a bottom surface of the groove, the locating block defines a locating slot in the upper surface, the locating slot is divided into a first slotted section and a second slotted section, the first slotted section is inversed V-shaped and sized to fittingly locate the coating, and the second slotted section is inversed V-shaped and sized to fittingly locate the front section.

5. The optical connector of claim 1, wherein the front surface and a bottom surface of the blind hole are mirror surfaces.

6. An optical connector assembly, comprising:
   two optical connectors, each of which comprises:
      a transparent shell defining a blind hole; and
      a lensed fiber integrally forming a lens at a front end thereof, the lensed fiber being inserted into the blind hole using the front end and held in the blind hole;
   wherein lensed fibers of the two optical connectors are optically aligned with each other, and a distance between the lensed fibers is twice a working distance of the lensed fibers.

7. The optical connector assembly of claim 6 wherein each shell is cuboid and comprises a front surface and a back surface opposite to the front surface, and the blind hole is formed in the back surface.

8. The optical connector assembly of claim 7, wherein each shell comprises a connecting sleeve extending outwards from the front surface, the connecting sleeve surrounds a portion of the front surface spatially corresponding to the blind hole, and the sleeve of one optical connector is sleeved by the sleeve of the other optical connector, thus mechanically connecting the two optical connectors.

9. The optical connector assembly of claim 7, wherein each lensed fiber comprises an optical fiber and a coating surrounding the optical fiber, a front section of the optical fiber adjacent to the front end is uncovered by the coating, the lens is formed on the optical fiber, each blind hole is divided into a first holed section adjacent to the back surface, a second holed section connected to the first holed section, and a third holed section connecting the second holed section, the first holed section and the second holed section are sized to fittingly hold the coating and the front section, respectively, and a cross-sectional size of the third holed section is smaller than that of the second holed section and the second holed section is slightly shorter than the front section such that the lens is partially held in the third holed section.

10. The optical connector assembly of claim 9, wherein each shell comprises a side surface connecting the front surface and the back surface, the shell defines a groove in the side surface, the groove communicates with the first holed section and the second holed section, each of the optical connectors comprises a locating block, the locating block is fittingly received in the groove and comprises an upper surface facing a bottom surface of the groove, the locating block defines a locating slot in the upper surface, the locating slot is divided into a first slotted section and a second slotted section, the first slotted section is inversed V-shaped and sized to fittingly locate the coating, and the second slotted section is inversed V-shaped and sized to fittingly locate the front section.

11. The optical connector assembly of claim 7, wherein the front surface of each shell and a bottom surface of each blind hole are mirror surfaces.

* * * * *